(12) United States Patent
Edwards (10) Patent No.: US 10,857,917 B1
(45) Date of Patent: Dec. 8, 2020

(54) RECLINING CHILD CAR SEAT WITH ADJUSTABLE HEAD SUPPORT

(71) Applicant: Ellen Edwards, Huntington, NY (US)

(72) Inventor: Ellen Edwards, Huntington, NY (US)

( * ) Notice: Subject to any disclaimer, the term of this patent is extended or adjusted under 35 U.S.C. 154(b) by 0 days.

(21) Appl. No.: 16/545,062

(22) Filed: Aug. 20, 2019

(51) Int. Cl.
*B60N 2/26* (2006.01)
*B60N 2/28* (2006.01)
*A47C 13/00* (2006.01)
*A47D 1/10* (2006.01)

(52) U.S. Cl.
CPC ......... *B60N 2/2878* (2013.01); *B60N 2/2851* (2013.01); *B60N 2/2881* (2013.01)

(58) Field of Classification Search
CPC ... B60N 2/2851; B60N 2/2878; B60N 2/2881
USPC .......... 297/61, 118, 250.1–256.16, 341, 342, 297/343, 354.1, 354.12, 354.13, 358, 409, 297/410
See application file for complete search history.

(56) References Cited

U.S. PATENT DOCUMENTS

| 2,859,797 | A | * | 11/1958 | Mitchelson | ............. | B60N 2/874 |
| | | | | | | 297/61 |
| 4,274,674 | A | * | 6/1981 | Deloustal | ............... | B60N 2/286 |
| | | | | | | 297/256.13 |
| 4,762,364 | A | * | 8/1988 | Young | ................... | B60N 2/2821 |
| | | | | | | 297/256.13 X |
| 4,805,928 | A | * | 2/1989 | Nakao | ....................... | B62B 7/08 |
| | | | | | | 297/61 X |
| 4,998,307 | A | * | 3/1991 | Cone | ..................... | B60N 2/2806 |
| | | | | | | 297/256.13 X |
| 5,092,004 | A | * | 3/1992 | Cone | ..................... | B60N 2/2806 |
| | | | | | | 297/354.13 X |
| 5,115,523 | A | * | 5/1992 | Cone | ..................... | B60N 2/2806 |
| | | | | | | 297/256.13 |
| 5,195,770 | A | * | 3/1993 | Ishikura | .................. | B62B 7/123 |
| | | | | | | 297/61 X |
| 5,383,711 | A | | 1/1995 | Houghteling | | |
| 5,486,037 | A | | 1/1996 | Harper | | |
| 5,524,964 | A | * | 6/1996 | Weimersheimer | ....... | B60N 2/14 |
| | | | | | | 297/354.13 X |
| 5,681,084 | A | * | 10/1997 | Yoneda | .................. | A47D 1/002 |
| | | | | | | 297/354.13 X |

(Continued)

FOREIGN PATENT DOCUMENTS

EP     2484549     6/2013

*Primary Examiner* — Rodney B White
(74) *Attorney, Agent, or Firm* — Kyle A. Fletcher, Esq.

(57) ABSTRACT

The reclining child car seat with adjustable head support is a child safety seat. The reclining child car seat with adjustable head support comprises a seat structure, a harness, a locking hinge, and a rack and pinion structure. The seat structure further comprises a bench, a backrest, and a headrest. The reclining child car seat with adjustable head support is a reclining structure that is further defined with a cant. The reclining child car seat with adjustable head support is further configured such that the protective structure of the headrest automatically adjusts as a function of the cant of the reclining structure of the reclining child car seat with adjustable head support. The locking hinge attaches the backrest to the bench such that the backrest rotates relative to the bench. The rack and pinion structure forms a mechanical linkage that adjusts the headrest as a function of the cant. The harness secures the client in the seat structure.

18 Claims, 5 Drawing Sheets

(56) References Cited

U.S. PATENT DOCUMENTS

| | | | | |
|---|---|---|---|---|
| 5,975,636 | A * | 11/1999 | Koch | B60N 2/242 |
| | | | | 297/354.13 X |
| 5,988,752 | A | 11/1999 | Richards | |
| 6,196,629 | B1 * | 3/2001 | Onishi | B60N 2/2806 |
| | | | | 297/354.13 X |
| 6,644,747 | B2 | 11/2003 | Jones | |
| 6,679,552 | B1 * | 1/2004 | Kassai | B60N 2/2812 |
| | | | | 297/250.1 |
| 6,896,326 | B2 * | 5/2005 | Chen | A47D 1/002 |
| | | | | 297/354.12 X |
| 7,008,018 | B2 * | 3/2006 | Chen | A47D 1/002 |
| | | | | 297/363 |
| D530,136 | S | 10/2006 | Toth | |
| 7,219,959 | B2 * | 5/2007 | Ransil | A47D 13/105 |
| | | | | 297/354.12 X |
| 7,364,235 | B2 * | 4/2008 | Chen | A47D 1/002 |
| | | | | 297/354.13 X |
| 7,625,043 | B2 * | 12/2009 | Hartenstine | B60N 2/2806 |
| | | | | 297/250.1 |
| 7,806,472 | B2 | 10/2010 | Runk | |
| 7,862,117 | B2 * | 1/2011 | Hutchinson | B60N 2/2851 |
| | | | | 297/250.1 X |
| 8,251,446 | B1 * | 8/2012 | Guerrido | A47D 1/002 |
| | | | | 297/250.1 X |
| 8,276,988 | B2 * | 10/2012 | Hartenstine | B60N 2/2884 |
| | | | | 297/250.1 |
| 8,690,250 | B2 * | 4/2014 | Zhen | B62B 7/123 |
| | | | | 297/354.13 X |
| 8,894,151 | B2 * | 11/2014 | Poniatowski | B60N 2/2893 |
| | | | | 297/342 |
| 9,975,457 | B2 * | 5/2018 | Chen | B60N 2/2227 |
| 10,052,982 | B1 * | 8/2018 | Danley | B60N 2/2851 |
| 2003/0011221 | A1 * | 1/2003 | Yoshie | A47D 1/002 |
| | | | | 297/354.13 X |
| 2007/0040428 | A1 * | 2/2007 | Sakumoto | B60N 2/2851 |
| | | | | 297/250.1 |
| 2007/0120403 | A1 * | 5/2007 | Drexler | B60N 2/2803 |
| | | | | 297/250.1 |
| 2007/0246982 | A1 * | 10/2007 | Nett | B60N 2/2851 |
| | | | | 297/250.1 |
| 2008/0018155 | A1 * | 1/2008 | Smiley | B60N 2/24 |
| | | | | 297/341 |
| 2011/0175306 | A1 * | 7/2011 | Newhard | B62B 9/104 |
| | | | | 297/354.13 X |
| 2012/0326476 | A1 | 12/2012 | Runk | |
| 2016/0152162 | A1 * | 6/2016 | Finck | B60N 2/12 |
| | | | | 297/342 |
| 2019/0092194 | A1 * | 3/2019 | Johnson | B60N 2/815 |
| 2020/0047647 | A1 * | 2/2020 | Oswald | B60N 2/2872 |

* cited by examiner

RECLINING CHILD CAR SEAT WITH ADJUSTABLE HEAD SUPPORT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including seats adapted for a particular purpose within the vehicle, more specifically, a seat configured for use by a child that: a) removably mounts on an existing seat; and, b) has an inclinable backrest. (B60N2/2878)

SUMMARY OF INVENTION

The reclining child car seat with adjustable head support is a child safety seat. The reclining child car seat with adjustable head support comprises a seat structure, a harness, a locking hinge, and a rack and pinion structure. The seat structure further comprises a bench, a backrest, and a headrest. The reclining child car seat with adjustable head support is a reclining structure. By reclining structure is meant that a cant formed between the bench and the backrest is adjustable. The reclining child car seat with adjustable head support is further configured such that the protective structure of the headrest automatically adjusts as a function of the cant of the reclining structure of the reclining child car seat with adjustable head support. The locking hinge attaches the backrest to the bench such that the backrest rotates relative to the bench. The rack and pinion structure forms a mechanical linkage that adjusts the headrest as a function of the cant. The harness secures the client in the seat structure.

These together with additional objects, features and advantages of the reclining child car seat with adjustable head support will be readily apparent to those of ordinary skill in the art upon reading the following detailed description of the presently preferred, but nonetheless illustrative, embodiments when taken in conjunction with the accompanying drawings.

In this respect, before explaining the current embodiments of the reclining child car seat with adjustable head support in detail, it is to be understood that the reclining child car seat with adjustable head support is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reclining child car seat with adjustable head support.

It is therefore important that the claims be regarded as including such equivalent construction insofar as they do not depart from the spirit and scope of the reclining child car seat with adjustable head support. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
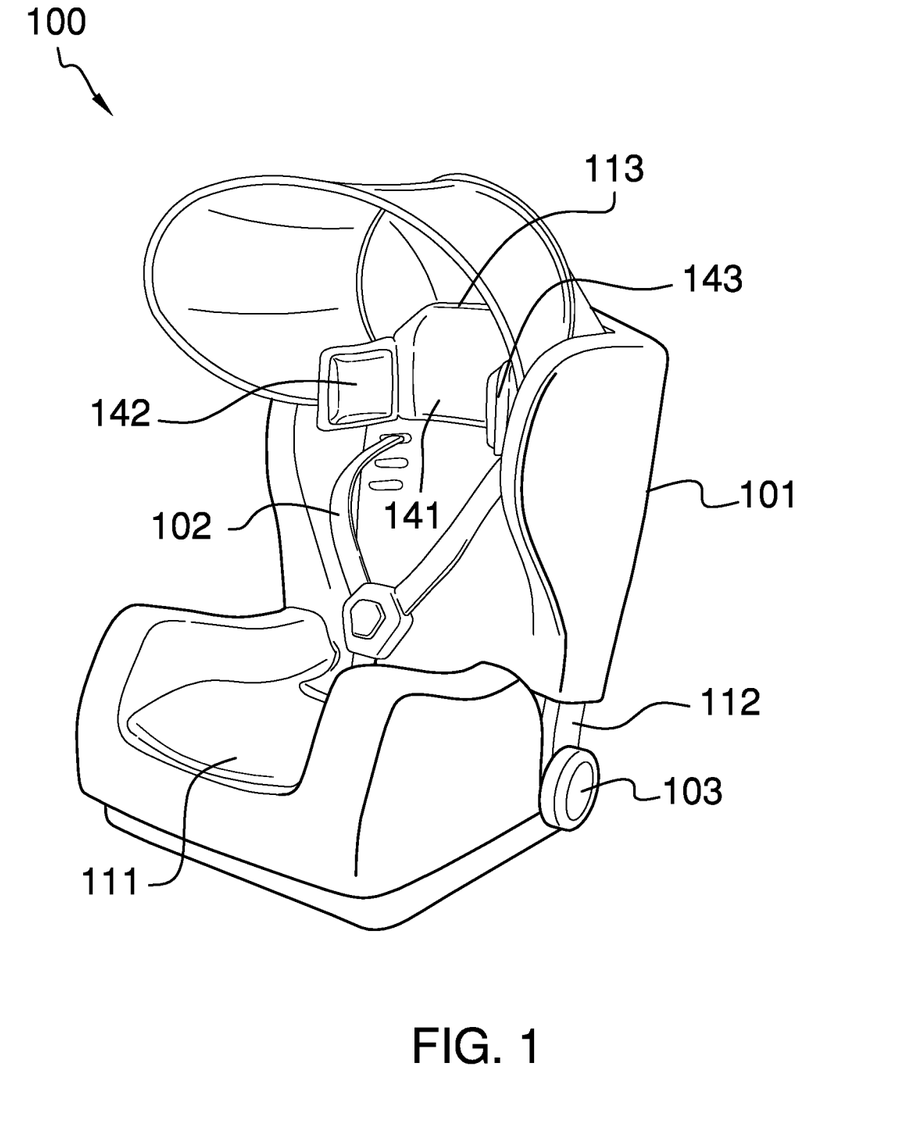
FIG. 1 is a perspective view of an embodiment of the disclosure.
Figure 2:
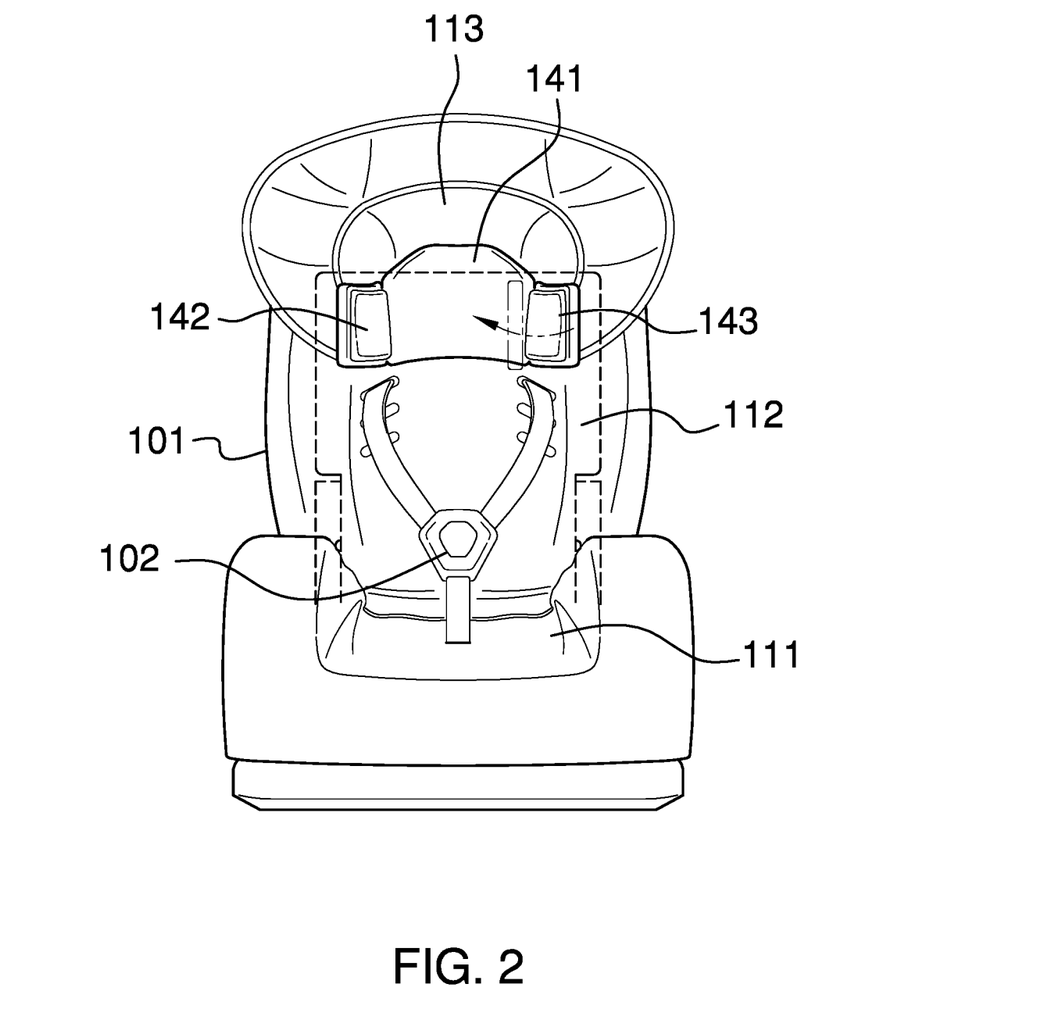
FIG. 2 is a front view of an embodiment of the disclosure.
Figure 3:
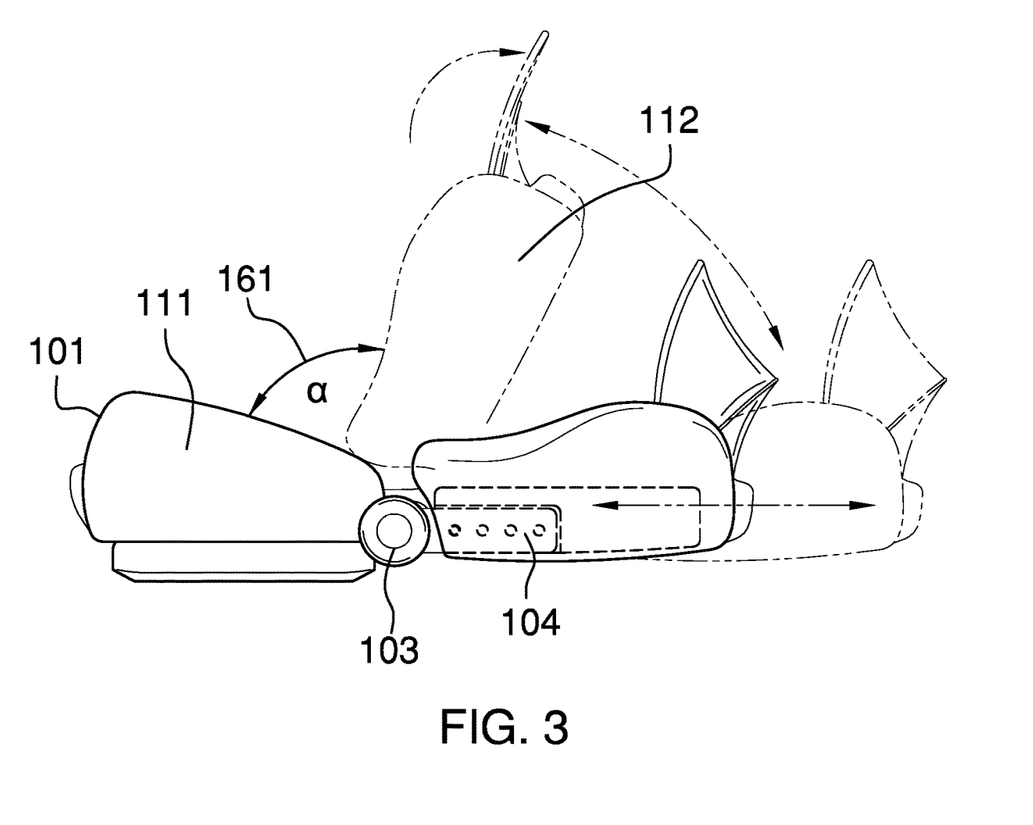
FIG. 3 is a side view of an embodiment of the disclosure.
Figure 4:
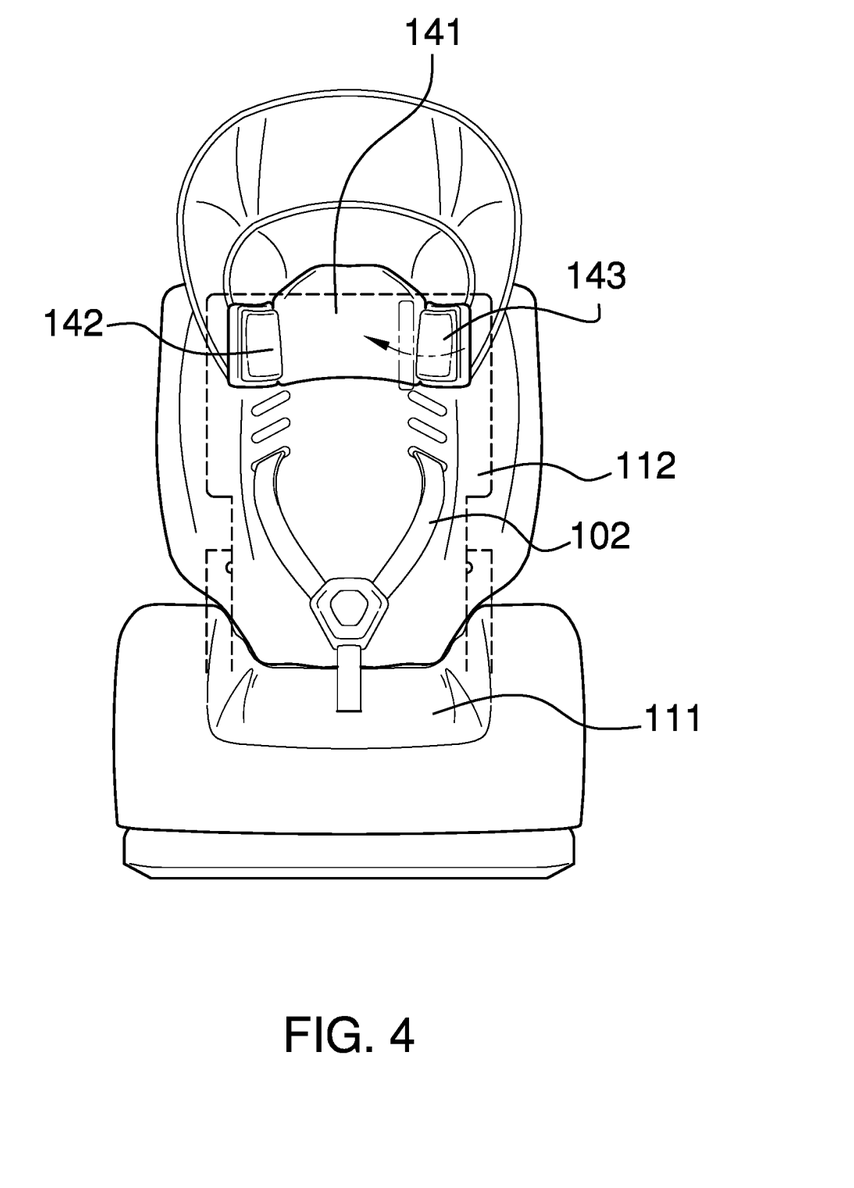
FIG. 4 is a front view of an embodiment of the disclosure.
Figure 5:
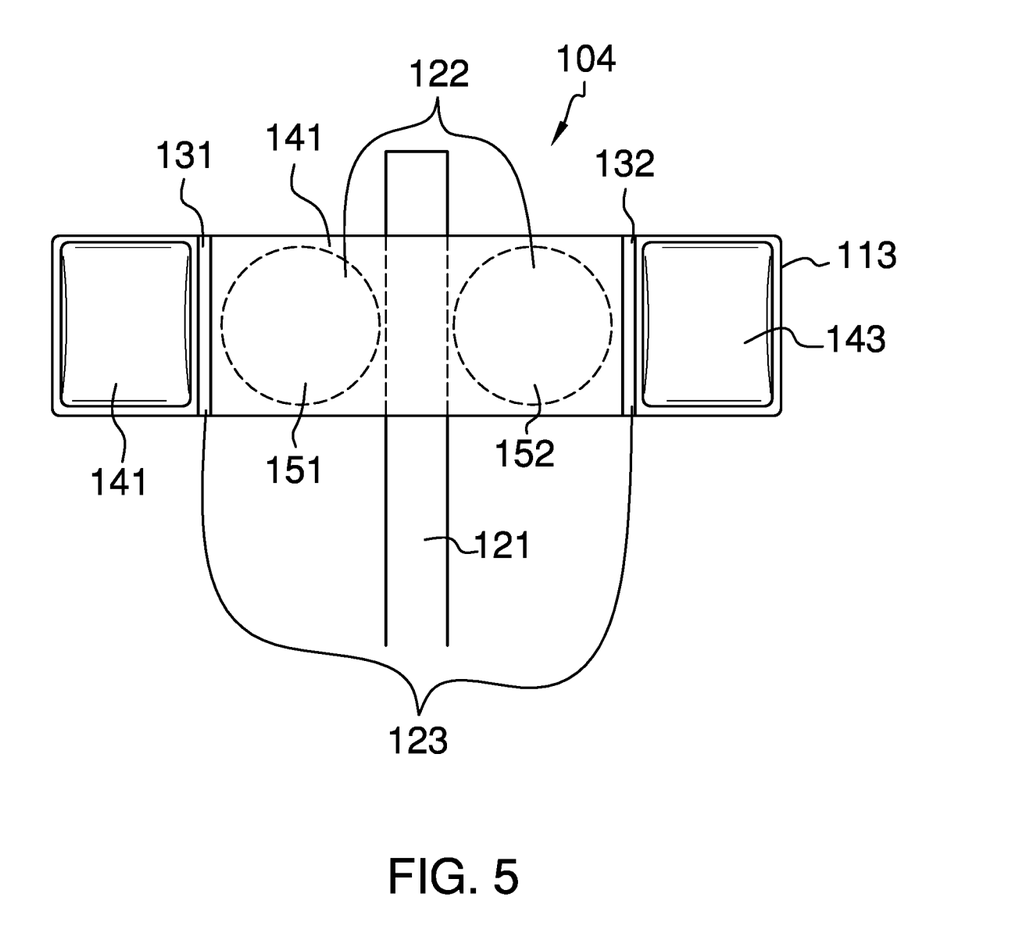
FIG. 5 is a detail view of an embodiment of the disclosure.

Detailed reference will now be made to one or more potential embodiments of the disclosure, which are illustrated in FIGS. 1 through 5.

The reclining child car seat with adjustable head support 100 (hereinafter invention) is a child safety seat. The invention 100 comprises a seat structure 101, a harness 102, a locking hinge 103, and a rack 121 and pinion structure 104. The seat structure 101 further comprises a bench 111, a backrest 112, and a headrest 113. The invention 100 is a reclining structure. By reclining structure is meant that a cant 161 formed between the bench 111 and the backrest 112 is adjustable. The invention 100 is further configured such that the protective structure of the headrest 113 automatically adjusts as a function of the cant 161 of the reclining structure of the invention 100. The locking hinge 103 attaches the backrest 112 to the bench 111 such that the backrest 112 rotates relative to the bench 111. The rack 121 and pinion structure 104 forms a mechanical linkage that adjusts the headrest 113 as a function of the cant 161. The harness 102 secures the client in the seat structure 101.

The seat structure 101 is a chair that removably attaches to a seat in an automobile. The seat structure 101 is secured to the automobile seat using a LATCH apparatus. The seat structure 101 forms the structure in which a client sits. The seat structure 101 comprises a bench 111, a backrest 112, and a headrest 113. The seat structure 101 is further defined with a cant 161.

The bench 111 forms a horizontal supporting surface that acts as a pedestal on which the client sits. The bench 111 is defined in greater detail elsewhere in this disclosure. The use of a bench 111 in a seat is well-known and documented in the furniture arts.

The backrest 112 is a rotating structure that attaches to the bench 111. The backrest 112 provides a vertical supporting surface for the client. The backrest 112 rotates from a roughly vertical position to a roughly horizontal position.

The backrest 112 and the bench 111 combine to form a cant 161. The cant 161 is the arc of the span between the horizontal supporting surface formed by the bench 111 and the vertical supporting surface formed by the backrest 112. The rotation of the backrest 112 is the mechanism that adjusts the cant 161

The headrest 113 is a protective structure that mounts on the vertical supporting surface of the backrest 112. The head of the client fits in the headrest 113. The headrest 113 forms a cushion used to support the head. The headrest 113 forms a plurality of barriers that protect from impact injury. The headrest 113 comprises a medial pad 141, a dexter head guard 142, and a sinister head guard 143.

The medial pad 141 forms a cushion the attaches to the vertical supporting surface of the backrest 112. The medial pad 141 is a protective structure that protects the posterior region of the head of a client from injury. The dexter head guard 142 forms a rotating barrier that attaches to the dexter side of the medical pad 141. The dexter head guard 142 is a protective structure that protects the dexter region of the head of the client from injury. The sinister head guard 143 forms a rotating barrier that attaches to the sinister side of the medial pad 141. The sinister head guard 143 is a protective structure that protects the sinister region of the head of the client from injury.

The rack 121 and pinion structure 104 adjusts the span of the length between the dexter head guard 142 and the sinister head guard 143 during the use of the invention 100. The headrest 113 is defined in greater detail elsewhere in this disclosure.

The harness 102 is a safety harness 102. The harness 102 secures the client to the seat structure 101.

The locking hinge 103 is a hinge structure that attaches the backrest 112 to the bench 111 such that the backrest 112 rotates relative to the bench 111. The rotation of the backrest 112 changes the cant 161 between the backrest 112 and the bench 111. The locking hinge 103 further comprises a locking mechanism such that the locking hinge 103 will lock the cant 161 into a fixed position.

The rack 121 and pinion structure 104 is a mechanical linkage between the backrest 112 and the headrest 113. The rack 121 and pinion structure 104 mounts in the backrest 112 of the bench 111. The construction of the rack 121 and pinion structure 104 is such that the rotation of the backrest 112 relative to the bench 111 adjusts the span of the distance between the dexter head guard 142 and the sinister head guard 143. The rack 121 and pinion structure 104 is defined in greater detail elsewhere in this disclosure. The rack 121 and pinion structure 104 comprises a rack 121, a plurality of pinions 122, and a plurality of linked hinges 123.

The rack 121 is a toothed shaft structure. The rack 121 interacts with each of the plurality of pinions 122 such that the motion of the rack 121 relative to the plurality of pinions 122 causes the plurality of pinions 122 to rotate. The rack 121 and the backrest 112 are linked such that the rotation of the backrest 112 relative to the bench 111 causes the rack 121 to move relative to the plurality of pinions 122. The rack 121 is a well-known and documented component of a rack 121 and pinion structure 104.

Each of the plurality of pinions 122 is a toothed gear structure. Each of the plurality of pinions 122 interacts with the rack 121 such that the movement of the rack 121 causes each of the plurality of pinions 122 to rotate. The rotation of each of the plurality of pinions 122 causes the rotation of a head guard selected from the group consisting of the dexter head guard 142 and the sinister head guard 143 to rotate. The rotation of the dexter head guard 142 relative to the sinister head guard 143 causes the span of the distance between the dexter head guard 142 and the sinister head guard 143 to vary. The use of one or more pinions as a component in a rack 121 and pinion structure 104 is well-known and documented in the mechanical arts. The plurality of pinions 122 comprises a dexter pinion 151 and a sinister pinion 152.

The dexter pinion 151 is a gear-like structure that attaches the dexter linked hinge 131 to the rack 121 such that the motion of the rack 121 rotates the dexter linked hinge 131. The sinister pinion 152 is a gear-like structure that attaches the sinister linked hinge 132 to the rack 121 such that the motion of the rack 121 rotates the sinister linked hinge 132.

Each of the plurality of linked hinges 123 is a rotating fastening structure. Each of the plurality of linked hinges 123 attaches a head guard selected from the group consisting of the dexter head guard 142 and the sinister head guard 143 to the medial pad 141. Each of the plurality of linked hinges 123 attaches to a pinion selected from the plurality of pinions 122 to the selected head guard such that: a) the rotation of the selected pinion rotates the associated linked hinge selected from the plurality of linked hinges 123; and, b) the rotation of the associated linked hinge rotates the head guard associated with the selected linked hinge. The plurality of linked hinges 123 attaches the dexter head guard 142 and the sinister head guard 143 to the medial pad 141 such that the dexter head guard 142 is distal from the sinister head guard 143.

The plurality of linked hinges 123 comprises a dexter linked hinge 131 and a sinister linked hinge 132.

The dexter linked hinge 131 is the hinge selected from the plurality of linked hinges 123 that attaches the dexter head guard 142 to the dexter edge of the medial pad 141. The dexter linked hinge 131 is the hinge selected from the plurality of linked hinges 123 that attaches the dexter head guard 142 to the dexter pinion 151.

The sinister linked hinge 132 is the hinge selected from the plurality of linked hinges 123 that attaches the sinister head guard 143 to the sinister edge of the medial pad 141. The sinister linked hinge 132 is the hinge selected from the plurality of linked hinges 123 that attaches the sinister head guard 143 to the sinister pinion 152.

The following definitions were used in this disclosure:

Anterior: As used in this disclosure, anterior is a term that is used to refer to the front side or direction of a structure. When comparing two objects, the anterior object is the object that is closer to the front of the structure.

Arc: As used in this disclosure, an arc refers to a portion of a circumference or a curved perimeter. When applied to an angle, the arc also refers to a measure of an angular span as measured from a circle at the vertex formed by the sides of the angle.

Automatic: As used in this disclosure, automatic refers to a device, process, or a system that operates without human control, supervision or participation in the operation of the device, process, or system.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is further defined with a hood panel and a roof panel. The automobile is often defined with a trunk panel.

Backrest: As used in this disclosure, a backrest is a vertical or vertically canted supporting surface formed in a chair or seat.

Bench: As used in this disclosure, a bench is a horizontal supporting surface formed by a chair.

Cant: As used in this disclosure, a cant is an angular deviation from one or more reference lines (or planes) such as a vertical line (or plane) or a horizontal line (or plane).

Child Safety Seat: As used in this disclosure, a child safety seat is a safety device configured for use with an automobile. The child safety seat is a restraining device that protects a child from injury should an unfortunate event occur to the automobile. A booster seat refers to a child safety seat that is formed without a backrest. The booster seat acts as an intermediate safety device for a child that is too large to use a child safety seat but too small to safely use the seat belt system of a vehicle.

Client: As used in this disclosure, a client is an individual who is designated to receive the services of the disclosure at bar.

Coronal Direction: As used in this disclosure, the coronal direction runs from the dexter surface to the sinister surface of an object and is perpendicular to the sagittal direction and the transverse direction Coronal Plane: As used in this disclosure, the coronal plane refers to a reference plane that bisects an anterior surface and posterior surface such that the coronal plane contains the line of the coronal direction and the line of the sagittal direction. The coronal plane is also referred to as the lateral plane. The coronal plane is perpendicular to the sagittal plane and the transverse plane.

Cushion: As used in this disclosure a cushion is a structure formed with a pad that is used to prevent injury or damage to a person or object.

Dexter: As used in this disclosure, dexter is a directional reference that refers to the right side of an object from the perspective of a viewer who is facing the posterior side of the object.

Distal: As used in this disclosure, distal refers to a directional sense or location of an object. Specifically, distal refers to a first object, or a side of a first object, that is distal from the medial axis, or more proximal to the side of the object, relative to a second object, or side of a second object.

Force of Gravity: As used in this disclosure, the force of gravity refers to a vector that indicates the direction of the pull of gravity on an object at or near the surface of the earth.

Gear: As used in this disclosure, a gear is a toothed wheel, cylinder, or other toothed mechanical element that is used to transmit motion, a change of speed, or a change of direction to second toothed wheel, cylinder, or other toothed mechanical element.

Harness: As used in this disclosure, a harness is an apparatus comprising a plurality of straps and one or more fasteners that is used to fasten or anchor a first person or first object to a second object. The phrase N point harness refers to the installation of the harness wherein the harness has N anchor points. For example, a 2 point harness has two anchor points while a 5 point harness has five anchor points.

Hinge: As used in this disclosure, a hinge is a device that permits the turning, rotating, or pivoting of a first object relative to a second object. A hinge designed to be fixed into a set position after rotation is called a locking hinge.

Headrest: As used in this disclosure, a headrest is a pad that attaches to or extends from the back of a seat. The headrest is configured to cushion the head of a client.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Impact: As used in this disclosure, an impact refers to a rapid exchange of momentum between two objects. An impact often refers to a collision between two objects.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

LATCH: As used in this disclosure, LATCH is an acronym for "Lower Anchors and Tethers for Children." The LATCH is an international standard, ISO 13216, for the design and placement of attachment points for child safety seats in passenger cars. LATCH is also referred to as LUAS (Lower Universal Anchorage System), Canfix, UCSSS (Universal Child Safety Seat System) or ISOFIX.

Lateral: As used in this disclosure, the term lateral refers to an axis of an object that is perpendicular in the horizontal plane to the primary sense of direction of the object. Lateral movement is always perpendicular to the anterior-posterior axis. Lateral sides form the boundary of a coronal plane.

Mechanical Linkage: As used in this disclosure, a mechanical linkage is an interconnected arrangement of components that are used to manage the transfer of a movement or a force. A mechanical linkage is often referred to as a linkage.

Medial: As used in this disclosure, medial refers to a directional sense or location of an object. Specifically, medial refers to a first object or a side of a first object that is closer to the medial axis or more distal from the side of the object relative to a second object or side of a second object.

Medial Axis: As used in this disclosure, the medial axis is the center line of an as the line is drawn from the superior surface to the inferior surface. When two objects are compared relative to the medial axis, the object closer to the medial axis is referred to as the medial object and the object distal from the medial axis is referred to as the lateral object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the anterior of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rack and Pinion: As used in this disclosure, a rack and pinion is a gearing system that is designed to convert rotational energy into linear energy or the reverse. The rack is a toothed shaft that moves in a linear manner. The pinion is a gear (generally mounted on a rotating shaft) that interacts with the rack such that when the pinion rotates the rack is moved in a linear direction. Reversing the direction of rotation of the pinion will reverse the direction of the rack. Rack and pinion systems are well known and documented in the mechanical arts.

Recline: As used in this disclosure, recline refers to a person who lies backward with the back supported. A person in such a position is said to be in a reclined position. Alternatively, recline may refer to a seat or chair wherein the back of the seat is in a sloped position such that a person sitting in the seat is in a reclined position. Such a seat or chair is often referred to as a reclining chair or a reclining seat.

Roughly: As used in this disclosure, roughly refers to a comparison between two objects. Roughly means that the difference between one or more parameters of the two compared are not significantly different.

Sagittal Direction: As used in this disclosure, the sagittal direction runs from the superior surface to the inferior surface of an object and is perpendicular to the coronal direction and the transverse direction.

Sagittal Plane: As used in this disclosure, the sagittal plane refers to a reference plane that bisects a dexter surface and sinister surface such that the sagittal plane contains the line of the coronal direction and the line of the sagittal direction. The sagittal plane is perpendicular to the coronal plane and the transverse plane.

Seat: As used in this disclosure, a seat is a structure that a person can sit on. Chair is a common synonym for a seat.

Sinister: As used in this disclosure, sinister is a directional reference that refers to the left side of an object from the perspective of a viewer who is facing the posterior side of the object.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Teeth: As used in this disclosure, the teeth refer to a plurality of working elements of a tool that interact with a pawl or with other teeth to perform the function of the tool. The teeth found on gears is a common example of the use of teeth. An individual working element selected from the plurality of working elements is called a tooth.

Transverse Direction: As used in this disclosure, the transverse direction runs from the anterior surface to the posterior surface of an object and is perpendicular to the coronal direction and the sagittal direction Transverse Plane: As used in this disclosure, the transverse plane refers to a reference plane that bisects a superior surface and inferior surface such that the transverse plane contains the line of the transverse direction and the line of the transverse direction. The transverse plane is perpendicular to the coronal plane and the sagittal plane.

Vehicle: As used in this disclosure, a vehicle is a motorized device used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A seat with adjustable headrest comprising
a seat structure, a harness, a locking hinge, and a rack and pinion structure;
wherein the seat structure further comprises a bench, a backrest, and a headrest;
wherein the locking hinge attaches the backrest to the bench such that the backrest rotates relative to the bench;
wherein the seat with adjustable headrest is a child safety seat;
wherein the seat with adjustable headrest is a reclining structure;
wherein the rack and pinion structure forms a mechanical linkage between the backrest and the headrest;
wherein a cant is formed between the bench and the backrest;
wherein the cant is adjustable;
wherein the seat with adjustable headrest is further configured such that the headrest automatically adjusts as a function of the cant of the reclining structure of the seat with adjustable headrest.

2. The seat with adjustable headrest according to claim 1
wherein the locking hinge is a hinge structure that attaches the backrest to the bench such that the backrest rotates relative to the bench;
wherein the rotation of the backrest changes the cant between the backrest and the bench;
wherein the locking hinge further comprises a locking mechanism such that the locking hinge will lock the cant into a fixed position.

3. The seat with adjustable headrest according to claim 2 wherein the rack and pinion structure forms a mechanical linkage that adjusts the headrest as a function of the cant.

4. The seat with adjustable headrest according to claim 3 wherein the harness is a fastening structure.

5. The seat with adjustable headrest according to claim 4
wherein the seat structure comprises the bench, the backrest, and the headrest;
wherein the bench attaches to the backrest;
wherein the headrest attaches to the backrest;
wherein the seat structure is further defined with the cant.

6. The seat with adjustable headrest according to claim 5
wherein the bench forms a horizontal supporting surface;
wherein the backrest forms a vertical supporting surface.

7. The seat with adjustable headrest according to claim 6
wherein the backrest is a rotating structure;
wherein the backrest rotates from a roughly vertical position to a roughly horizontal position.

8. The seat with adjustable headrest according to claim 7 wherein the cant is an arc of a span between the horizontal supporting surface formed by the bench and the vertical supporting surface formed by the backrest.

9. The seat with adjustable headrest according to claim 8 wherein the rotation of the backrest is a mechanism that adjusts the cant.

10. The seat with adjustable headrest according to claim 9
wherein the headrest is a protective structure;
wherein the headrest mounts on the vertical supporting surface of the backrest.

11. The seat with adjustable headrest according to claim 10
wherein the headrest comprises a medial pad, a dexter head guard, and a sinister head guard;
wherein the dexter head guard attaches to a dexter side of the medial pad;
wherein the sinister head guard attaches to a sinister side of the medial pad.

12. The seat with adjustable headrest according to claim 11
wherein the medial pad forms a cushion that attaches to the vertical supporting surface of the backrest;
wherein the dexter head guard forms a rotating barrier;
wherein the sinister head guard forms a rotating barrier;
wherein the rack and pinion structure adjusts a span of a length between the dexter head guard and the sinister head guard during the use of the seat with adjustable headrest.

13. The seat with adjustable headrest according to claim 12
wherein the rack and pinion structure mounts in the backrest of the bench;
wherein the construction of the rack and pinion structure is such that the rotation of the backrest relative to the bench adjusts the span of the distance between the dexter head guard and the sinister head guard.

14. The seat with adjustable headrest according to claim 13
wherein the rack and pinion structure comprises a rack, a plurality of pinions, and a plurality of linked hinges;
wherein the rack is a toothed shaft structure;
wherein each of the plurality of pinions is a toothed gear structure;
wherein each of the plurality of pinions interacts with the rack such that the movement of the rack causes each of the plurality of pinions to rotate;
wherein the rack and the backrest are linked such that the rotation of the backrest relative to the bench causes the rack to move relative to the plurality of pinions;
wherein the rotation of each of the plurality of pinions causes the rotation of a head guard selected from the group consisting of the dexter head guard and the sinister head guard to rotate.

15. The seat with adjustable headrest according to claim 14 wherein each of the plurality of linked hinges attaches to a pinion selected from the plurality of pinions to the selected head guard such that: a) the rotation of the selected pinion rotates the associated linked hinge selected from the plurality of linked hinges; and, b) the rotation of the associated linked hinge rotates the head guard associated with the selected linked hinge.

16. The seat with adjustable headrest according to claim 15 wherein the rotation of the dexter head guard relative to the sinister head guard causes a span of a distance between the dexter head guard and the sinister head guard to vary.

17. The seat with adjustable headrest according to claim 16
wherein the plurality of pinions comprises a dexter pinion and a sinister pinion;
wherein the dexter pinion is a geared like structure that attaches a dexter linked hinge to the rack such that the motion of the rack rotates the dexter linked hinge;
wherein the sinister pinion is a geared like structure that attaches a sinister linked hinge to the rack such that the motion of the rack rotates the sinister linked hinge;
wherein the plurality of linked hinges attaches the dexter head guard and the sinister head guard to the medial pad such that the dexter head guard is distal from the sinister head guard.

18. The seat with adjustable headrest according to claim 17
wherein each of the plurality of linked hinges is a rotating fastening structure;

wherein the plurality of linked hinges comprises a dexter linked hinge and a sinister linked hinge;
wherein the dexter linked hinge is the hinge selected from the plurality of linked hinges that attaches the dexter head guard to the dexter edge of the medial pad;
wherein the sinister linked hinge is the hinge selected from the plurality of linked hinges that attaches the sinister head guard to the sinister edge of the medial pad;
wherein the dexter linked hinge is the hinge selected from the plurality of linked hinges that attaches the dexter head guard to the dexter pinion;
wherein the sinister linked hinge is the hinge selected from the plurality of linked hinges that attaches the sinister head guard to the sinister pinion.

\* \* \* \* \*